April 1, 1947.   W. LESER   2,418,415
WELDER'S MASK
Filed March 7, 1944
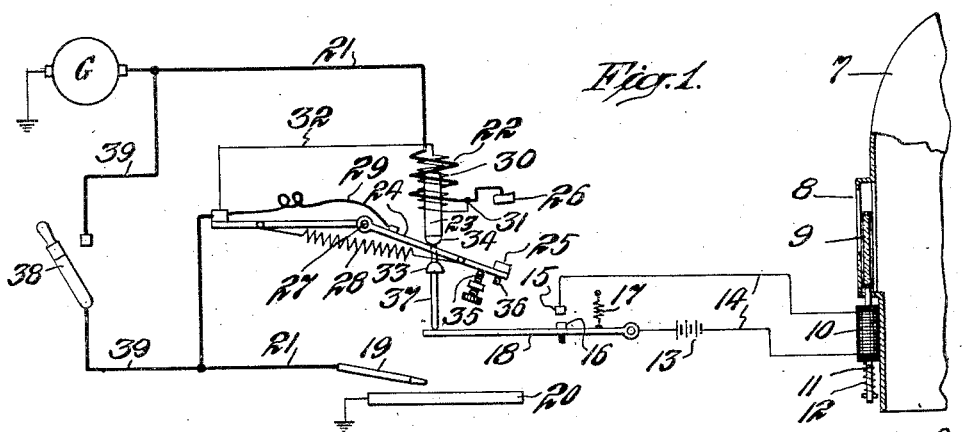
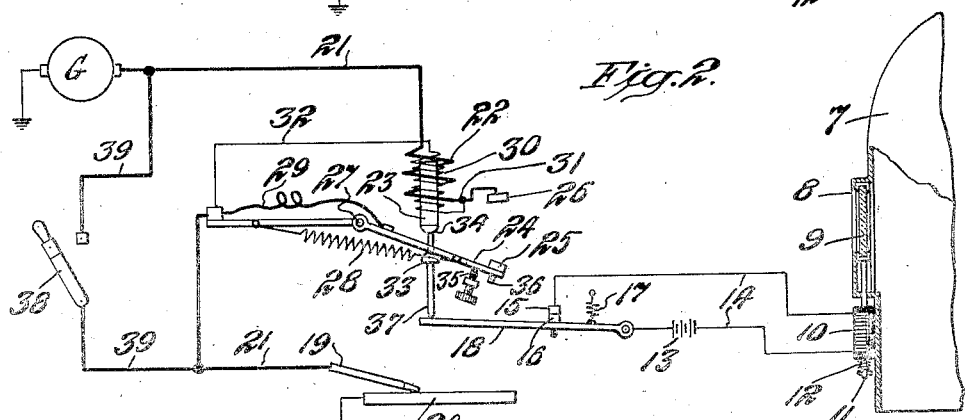
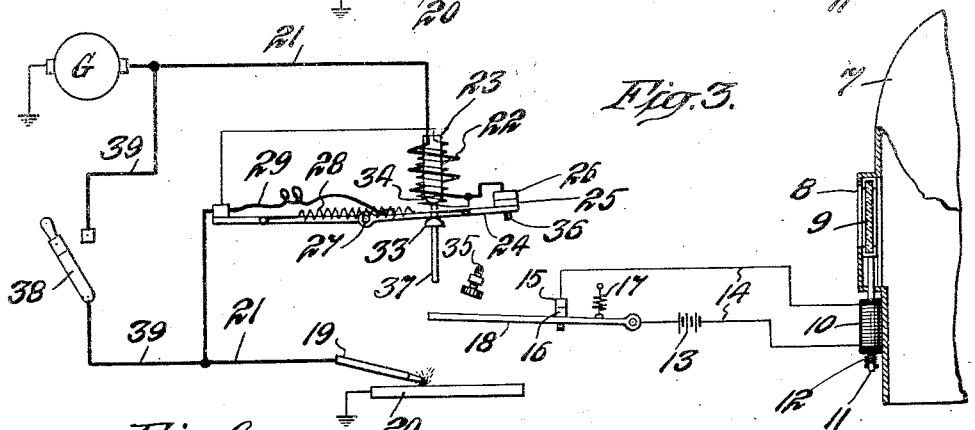
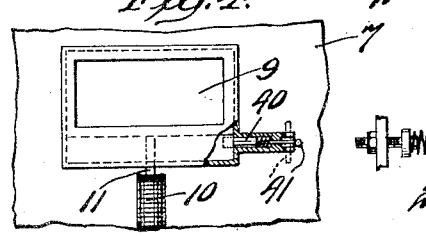
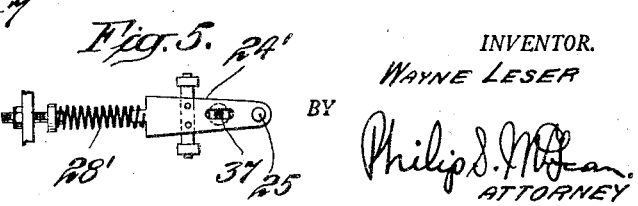
INVENTOR.
WAYNE LESER
BY
ATTORNEY Patented Apr. 1, 1947

2,418,415

UNITED STATES PATENT OFFICE 2,418,415

WELDER'S MASK

Wayne Leser, South Ozone Park, N. Y.

Application March 7, 1944, Serial No. 525,459

6 Claims. (Cl. 2—8)

1

The invention here disclosed relates to protective masks or shields used by welders.

These shields are necessary to protect the eyes of the operator, but it is desirable, particularly for fine work, that the operator be able to see the work clear of any light obstructing screen.

The present invention aims to provide a construction which will enable the welder to clearly see the work at all times up to the moment that the parts are ready to be welded and will automatically place a shielding screen in position before the eyes the moment the electrode is applied to the work and before the welding circuit is completed to strike the arc.

At times, it may be desirable to put the automatic control out of operation and in some cases, to secure the shutter or screen in protective position. Further objects of the invention are to provide simple and satisfactory means for accomplishing these additional results.

Other desirable objects and the novel features by which all purposes of the invention are attained, are hereinafter set forth or will appear in the course of the following specification.

The drawing accompanying and forming part of the specification illustrates present practical embodiments of the invention, but structure and operation may be modified and changed all within the true intent and broad scope of the invention as hereinafter defined and claimed.

Fig. 1 is a general view largely diagrammatic, illustrating the open circuit condition with the electrode out of contact and the safety shutter open to permit free inspection of the work.

Fig. 2 is a similar view showing the electrode touched to the work and closing a preliminary circuit for starting the switch movement to effect closing of the safety shutter.

Fig. 3 is a like view showing the welding circuit completed and the electrode fully in service.

Fig. 4 is a broken sectional detail illustrating a form of catch for securing the shutter in protective position.

Fig. 5 is a broken detail of a modified form of the welding circuit switch.

In the several views, a welding shield is represented at 7, having a window 8, for viewing the work and a sliding shutter 9, for protecting the eyes of the operator.

This shutter is shown as arranged to be raised to the closed position by a solenoid 10, having a core 11, connected with the shutter. A spring 12, is shown acting on the core to snap the shutter quickly to open position when the solenoid is deenergized.

2

The shutter closing solenoid 10, preferably has a local, low voltage energizing circuit, such as provided by storage battery 13, connected with the solenoid by wiring 14, and including switch contacts 15, 16, biased to the closed circuit position by spring 17, acting on the switch closing lever 18.

An electrode and the work with which it cooperates are conventionally indicated at 19, 20.

The welding circuit, represented by heavy line connections 21, includes a number of magnetic turns 22, to form a holding coil for an armature 23, controlling a switch in this circuit.

The welding circuit switch is shown as of the spring toggle type, involving a lever 24, carrying a contact 25, for engagement with stationary contact 26, said lever being pivoted at 27, and adapted to be snapped past the dead center in either direction by spring 28. In the illustration, the lever is indicated as forming, with the contact 25, part of the welding circuit, being included in that circuit by the flexible "pigtail" connection 29.

Closing of the welding circuit switch is effected in the illustration by a magnet coil 30, shown as concentric with and disposed within the holding turns 22, of the welding circuit. These two coils, that is, holding coil 22 and magnet coil 30, are made up as a compound solenoid, with the windings connected in series relation at 31, and these are designed in this series relation to provide the power necessary to throw the armature core 23, into the fully closed switch relation. The other end of the switch throwing magnet coil is shown connected back into the welding circuit by wiring 32, providing a bridge about the switch contacts 25, 26.

To effect operation of the protective screen or shutter prior to closing of the welding circuit, the armature is shown as having a lost motion connection with switch lever 24, provided by spaced shoulders 33, 34, engageable, after predetermined movement of the armature core, with opposite sides of the switch lever.

The welding switch 24, 25, 26, is biased to the open circuit position, Fig. 1, in the present disclosure by the weight of the armature resting on the lever through engagement of the upper shoulder 34, with the upper side of the lever as in Fig. 1.

The open circuit position of switch lever 24, is indicated as controlled by an adjustable rest or stop 35, and the contact 25, may have a screw stem or the like, as indicated at 36, so that it may be adjusted to properly engage the companion contact 26.

The shutter closing circuit 14, 15, 16, 18, is controlled in the present disclosure by an extension 37, on the lower end of the armature core 23, disposed to engage and hold the spring tensioned switch lever 18, in open circuit position when both magnet coils are deenergized. The adjustable stop 35, by regulating the lowered position of switch lever 24, and the magnet core supported thereby, provides a means for adjusting the position of switch lever 18, and hence of switch contacts 15, 16.

Operation

In Fig. 1, with the electrode 19, off the work 20, the shutter 9, is open and the welder can see the work to fullest advantage through the open window at 8. In practice, this window may be simply an opening in the mask or it may have a transparent covering of clear or orange tinted or other colored glass. The shutter will remain in open position, so long as the electrode is kept clear of the work, the weight of armature 23, serving in such circumstances, to hold the shutter controlling circuit open at 15, 16, and the main circuit open at 25, 26.

When the electrode is touched to the work as in Fig. 2, circuit will be completed through connections 21, and through the holding turns 22, and by connections 31, 32, the switch actuating coil 30, will be included in this circuit, bypassed around the open switch contacts 25, 26. The combined effect of magnet windings 22, 30, is to lift solenoid core 23, and in the first part of such movement, that is, approximately up to the time that the lower shoulder 33, engages the lower side of switch lever 24, Fig. 2, the switch lever 18, will rise under the pull of spring 17, far enough to close the shutter control circuit at contacts 15, 16. The solenoid 10, being thereby energized, the shutter 9, will be snapped closed and this practically at the instant that the electrode touches the work. At this time, the two coils are in series in a branch 31, 32, of the welding circuit, distinct and apart from the other branch or main operating portion of the welding circuit, which is provided through switch contacts 25, 26, etc.

The holding turns 22, are few in number and of low resistance as compared to the turns of the switch throwing magnet 30, and the combined resistance of these two, or the resistance provided by the magnet winding (30), is sufficient to prevent the striking of any appreciable or objectionable arc, such as might be harmful to the eyes. This factor and the time lag provided by the lost motion connection at 33, 24, assures that the shutter will be fully closed before a welding arc is produced by the electrode.

After closing of the shutter is effected as last described, the switch lever 24, continuing its movement, closes the low resistance welding branch of the welding circuit at 25, 26, Fig. 3, and in this final position, the resistance of the magnet coil 30, is shunted, rendering such magnet substantially ineffective. This leaves the holding turns 22, in the low resistance welding branch of the circuit as the means for then sustaining the solenoid core. This sustaining force may be only just enough to hold the core, to make sure that at any instant the arc is broken, the holding turns will immediately release the core. This dropping of the core will apply a hammer blow to the switch lever 24, through engagement of the upper lost motion shoulder 34, with the top of the lever. This arrangement provides a sensitive control and gives a quick more or less powerful starting blow to effect the opening of the welding circuit. The snap operation of the spring toggle switch assures quick opening as well as quick closing movements. These movements may be timed further if desired, by utilization of known timing devices, such as dash pots or the like, and which, in the operations described, might be interposed to introduce a certain lag in the movement of the main switch from the Fig. 2 to the Fig. 3 position.

At any time when the automatic control is not desired, the same may be cut out of circuit or bypassed as by means of a hand switch shown at 38, for connecting the generator directly with the electrode through connections at 39.

To enable the welder to secure the shutter in closed position independently of automatic control, a catch may be provided, such as illustrated at 40, in Fig. 4, in the form of a spring advanced pin adapted when projected to support the shutter in upraised relation and arranged when not in use to be held back by a turnbutton or toggle member 41.

In the form of control switch shown, one or both the cooperating contacts 15, 16, may be adjustable and these switch points may be so located in respect to the length of the lever 18, as to close immediately this lever starts to move. In other words, this control switch may be timed to operate quickly in contrast to the slower acting welding circuit switch.

The contacts 25, 26, of the main switch are designed to carry the load of the welding circuit and the most suitable contact materials for this purpose may be selected, for example, such as heavy copper and carbon.

While at present a spring toggle type of switch is considered preferable, it is contemplated that other forms of switches may be used and other forms of toggle switches than that first shown. Thus as indicated in Fig. 5, a compression type of spring 28' may be employed instead of the tension spring first shown. This enables use of a shorter and heavier form of toggle lever 24', which may be designed to operate with a more delayed action than that first disclosed.

While in the illustration the weight of the solenoid core is utilized to shift the welding switch to the open position, and this is a desirable arrangement where the solenoid is vertical, it is contemplated that spring or other means may be employed for shifting or for assisting in shifting the switch in the opening direction, particularly in cases where the magnet may be disposed horizontally or otherwise.

At any time the welding is discontinued as by lifting the electrode off the work, the holding turns in the welding circuit, release the armature to effect opening of the welding circuit at the switch points 25, 26, and when this occurs, the switch lever 24 or 24' will be engaged first to open this circuit before interrupting the shutter holding circuit. Thus it is assured that the protective shutter will not be opened until after the welding circuit is broken. When using the sliding shutter form of protection, the shutter may be designed to be lowered into the protective position instead of being raised as first illustrated and in which case, the shutter may be raised by spring force and pulled down by the magnet. While in commercial practice the combination of actuating and holding magnet coils has been found practical and desirable, it is contemplated that other means may be so employed, such for one example, as a motor which can be energized to close and to clamp the main switch contacts in closed relation, after first effecting the shutter closing operation.

What is claimed is:

1. For a welder's mask having a protective screen, a welding circuit including magnetic turns forming a holding coil and a switch in series therewith, a switch throwing magnet in series in the welding circuit but bridged about said welding circuit switch, an armature operable by said magnet and arranged when so operated to be retained by said holding coil, said armature having a lost-motion operating connection with said switch, and screen controlling means operable by said armature in advance of said switch closing action.

2. For a welder's mask having a window and a protective shutter for said window, a welding circuit including a welding electrode and having a low resistance welding branch and a higher resistance non-arcing branch, means under control of said electrode for effecting automatic closing of circuit first through said non-arcing branch and then through said welding branch, and means for effecting operation of said shutter upon said first closing of circuit through said non-arcing branch of the welding circuit prior to closing of circuit through said low resistance welding branch, said last named means including a local circuit containing a local current supply independent of said low resistance welding branch and arranged to close before closing of said welding branch and not to open until after opening of said welding branch.

3. Control means for a welder's mask having a protective device controlled by an electric circuit and comprising, a welding circuit including a switch, an armature for opening and closing said switch, said armature being biased in the switch opening direction, a magnet in said welding circuit for throwing said armature in the switch closing direction and of sufficient resistance when included in the welding circuit to prevent objectionable arc, means for bridging said magnet about said welding circuit switch to effect switch closing actuation of said magnet and consequent short circuiting of the magnet by closure of said switch, said welding circuit having a magnetic portion acting on said armature in the switch closing direction and of sufficient magnetic strength to overcome the switch opening bias on said armature to hold the switch closed after being closed by the magnet, and a switch in the control circuit of said protective device arranged for actuation by said armature in the initial movement of the same in the switch closing direction and prior to closure of the welding circuit switch, said control circuit for the protective device of the mask being independent of said welding circuit and having a source of supply independent of the welding circuit and said control switch being arranged to be closed before and to be opened after said welding switch.

4. Control means for a welder's mask having a protective device controlled by an electric circuit and comprising, a welding circuit including a switch, said switch being of the spring toggle type to snap open or closed after being started in either direction, an armature for actuating said switch, said armature having a lost motion connection with said switch and being biased in the switch opening direction, a magnet in said welding circuit for throwing said armature in the switch closing direction and of sufficient resistance when included in the welding circuit to prevent objectionable arc, means for bridging said magnet about said welding circuit switch to effect switch closing actuation of said magnet and consequent short circuiting of the magnet by closure of said switch, said welding circuit having a magnetic portion acting on said armature in the switch closing direction and of sufficient magnetic strength to overcome the switch opening bias on said armature to hold the switch closed after being closed by the magnet, and a switch in the control circuit of said protective device arranged for actuation by said armature in the initial movement of the same in the switch closing direction and prior to closure of the welding circuit switch.

5. Control means for a welder's mask having a protective device controlled by an electric circuit and comprising, a welding circuit including a switch, an armature for opening and closing said switch, said armature being biased in the switch opening direction, a magnet in said welding circuit for throwing said armature in the switch closing direction and of sufficient resistance when included in the welding circuit to prevent objectionable arc, means for bridging said magnet about said welding circuit switch to effect switch closing actuation of said magnet and consequent short circuiting of the magnet by closure of said switch, said welding circuit having a magnetic portion acting on said armature in the switch closing direction and of sufficient magnetic strength to overcome the switch opening bias on said armature to hold the switch closed after being closed by the magnet, and a switch in the control circuit of said protective device arranged for actuation by said armature in the initial movement of the same in the switch closing direction and prior to closure of the welding circuit switch, said armature having a lost motion connection with said welding circuit switch and said control circuit switch being arranged to be actuated by said armature upon the taking up of the lost motion in the connection between said armature and welding circuit switch in the movement of the armature in the switch closing direction.

6. Control means for a welder's mask having a protective device controlled by an electric circuit and comprising, a welding circuit including a switch, an armature for opening and closing said switch, said armature being biased in the switch opening direction, a magnet in said welding circuit for throwing said armature in the switch closing direction and of sufficient resistance when included in the welding circuit to prevent objectionable arc, means for bridging said magnet about said welding circuit switch to effect switch closing actuation of said magnet and consequent short circuiting of the magnet by closure of said switch, said welding circuit having a magnetic portion acting on said armature in the switch closing direction and of sufficient magnetic strength to overcome the switch opening bias on said armature to hold the switch closed after being closed by the magnet, and a switch in the control circuit of said protective device arranged for actuation by said armature in the initial movement of the same in the switch closing direction and prior to closure of the welding circuit switch, said magnetic portion of the welding circuit including a magnetic winding in substantially concentric relation with said magnet, said armature having lost motion connection with said welding switch arranged when lost motion is taken up in movement in one direction to effect closing of said protective device control switch before closing the welding switch and when lost motion is taken up in movement in the opposite direction, to accomplish opening of the welding switch before opening said protective circuit switch and said protective circuit having a source of power supply independent of the welding circuit so as to be unaffected by current drawn in said welding circuit and so as not to chatter from interruptions in the welding circuit.

WAYNE LESER.

REFERENCES CITED

The following references are of record in the file of this patent:

UNITED STATES PATENTS

| Number | Name | Date |
| --- | --- | --- |
| 1,497,012 | Goodspeed | June 10, 1924 |
| 2,058,169 | Montague | Oct. 20, 1936 |
| 2,055,707 | Rippl | Sept. 29, 1936 |
| 2,384,517 | Zimmerman et al. | Sept. 11, 1945 |